(12) United States Patent
Seal et al.

(10) Patent No.: US 7,419,516 B1
(45) Date of Patent: Sep. 2, 2008

(54) USE OF OXIDE NANOPARTICLES IN SOOT REDUCTION

(75) Inventors: Sudipta Seal, Oviedo, FL (US); Eric L. Petersen, Orlando, FL (US); Sameer Deshpande, Orlando, FL (US); Swanand Patil, Orlando, FL (US); Suresh Chandra Kuiry, Orlando, FL (US)

(73) Assignee: Research Foundation of the University of Central Florida, Inc., Orlando, FL (US)

( * ) Notice: Subject to any disclaimer, the term of this patent is extended or adjusted under 35 U.S.C. 154(b) by 623 days.

(21) Appl. No.: 10/846,023

(22) Filed: May 14, 2004

(51) Int. Cl.
    *C10L 1/12* (2006.01)
    *C10L 1/32* (2006.01)
    *C10L 5/00* (2006.01)
(52) U.S. Cl. .............. 44/457; 44/354; 44/301; 44/500
(58) Field of Classification Search .......... 44/457, 44/354, 301, 500
See application file for complete search history.

(56) References Cited

U.S. PATENT DOCUMENTS

| 6,093,223 | A | | 7/2000 | Lemaire et al. | 44/354 |
| 6,136,048 | A | * | 10/2000 | Birchem et al. | 44/354 |
| 6,588,204 | B2 | | 7/2003 | Hirota et al. | 60/297 |
| 6,616,903 | B2 | | 9/2003 | Poles et al. | 423/210 |
| 6,660,683 | B1 | | 12/2003 | Yalris et al. | 502/241 |
| 6,680,279 | B2 | | 1/2004 | Cai et al. | 502/327 |

OTHER PUBLICATIONS

"*Cerium oxide nanoparticles: Size-selective formation and structure analysis*," Zhang, F., Chan, Sui-Wai, et al., Applied Physics Letters, vol. 80, No. 1, Jan. 7, 2002, pp. 127-129.

* cited by examiner

*Primary Examiner*—Cephia D Toomer
(74) *Attorney, Agent, or Firm*—Brian S. Steinberger; Joyce P. Morlin; Law Offices of Brian S. Steinberger, P.A.

(57) ABSTRACT

Novel nano-sized rare earth metal oxide prepared from aqueous reverse micelles is provided. The engineered nanoparticles have large surface area to volume ratios, and sufficient oxygen vacancies on the surface of each particle, so that when mixed with carbon-containing combustible fuels, the particles remain suspended indefinitely; there is a significant reduction in soot and other by-products of combustion, an increase in engine efficiency and less fuel consumed per mile traveled in various vehicles, such as, but not limited to, automobiles, defense vehicles, airplanes, ships and other surface or air-bearing vehicles.

12 Claims, 10 Drawing Sheets

USE OF OXIDE NANOPARTICLES IN SOOT REDUCTION

FIELD OF THE INVENTION

This invention relates to petroleum and other fuel additives, in particular to methods for making and using a composition of matter comprising nano-sized rare earth metal oxides for use as an additive to reduce soot and the formation of pollutants during fuel combustion.

BACKGROUND AND PRIOR ART

Partial or incomplete combustion of hydrocarbon fuels results in atmospheric pollutants, such as soot, as well as carbon monoxide, and other gases considered toxic and mutagenic, such as the nitrogen oxides. The carbon-containing fuels form soot during the combustion process and are released as emissions, which are harmful to the environment and the health and safety of living beings.

A wide variety of approaches have focused on reducing the emission of such condensed particles, hereinafter designated as "soot," whether carbon-based or other type of condensed material. One approach has been to develop a comprehensive emission control system involving the combustion and fuel injection process, the fuel composition, and the overall control strategy for the combined operation of the engine that inhibits the formation of unacceptable emission products. Another approach has been to develop devices, such as catalytic converters, particulate traps, filters and systems that treat exhaust products after their formation. Thus, the challenge is viewed as preventing the formation of soot or collecting and destroying soot after it has formed.

With regard to the use of additives or materials, including rare earth metal oxides and particularly ceria (cerium oxide), in emission control systems, U.S. Pat. No. 6,093,223 to Lemaire et al. discloses burning a combustible material or fuel after the addition of a concentrated solution of cerium compounds in ranges of from 50 to 150 parts per million (ppm) to reduce the formation of soot, or alternatively, producing aggregates of ceric oxide by burning a hydrocarbon fuel in the presence of a seed amount of ceric oxide crystallites.

U.S. Pat. No. 6,680,279 B2 to Cai et al. discloses a method of dispersing nanosized catalyst particles on the surface of larger catalyst carrier particles, which include cerium oxide mixed with alumina to increase oxygen storage capacity, for automotive exhaust gas treatment or for a fuel cell reformer. U.S. Pat. No. 6,660,683 B1 to Yaluris et al. describes a particulate composition comprising acidic metal oxide, alkaline earth metal, an oxygen storage component, such as cerium oxide, and a noble metal component for the reduction of nitrous oxides in refinery processes. U.S. Pat. No. 6,588,204 B2 to Hirota et al. describes a particulate filter in an exhaust system wherein a noble metal catalyst and an active oxygen-releasing agent (such as ceria) are used to oxidize and remove the particulates trapped in the filter. There is also a method for treating the atmosphere to remove pollutants as disclosed in U.S. Pat. No. 6,616,903 B2 to Poles et al. Poles et al. equips billboards, solar panels or similar outdoor devices with catalysts on ceria support to convert pollutants to non-objectionable materials or adsorption compositions to collect pollutants for later destruction.

However, the above-mentioned references use ceria crystallites, aggregates, particles and nanoparticles of a different size and oxygen storage capability than the ceria nanoparticles of the present invention. The ceria nanoparticles disclosed herein have been engineered for use in a liquid, gaseous or solid fuel and prevent the formation of soot or other objectionable pollutants during combustion.

Governmental concern for the harmful effects of soot on the environment, including the health and safety of all life forms, leads to worldwide regulations enacted to reduce both particulate matter (soot) and nitrogen oxides. In the United States alone, there are regulatory measures mandating a 98.3% reduction in 1990 allowable levels for particulate emissions from on-road vehicles by the year 2007. Smog and particulate matter account for 15,000 premature deaths and 400,000 asthma attacks annually in the US.

There is a need to identify the best technology to address emissions reduction, engine efficiency and fuel consumption issues. None of the prior art methods, processes, and devices is deemed satisfactory. Prior methods have difficulty when combining the emissions-reducing additive with the fuel due to incompatibility and settling issues.

SUMMARY OF THE INVENTION

A primary objective of the present invention is to provide compositions with an oxygen storage capability that can be combined with hydrocarbon fuels and reduce soot formation/emissions during the combustion of carbon-containing fuel or other combustible materials.

A secondary objective of the present invention is to provide nano-sized particles with an oxygen storage capability and methods for obtaining more miles per gallon of fuel consumed by vehicles, such as automobiles, defense vehicles, airplanes, ships and the like.

A third objective of the present invention is to provide nano-sized particles of a rare earth metal oxide using a microemulsion technique, thereby producing large surface area to volume ratio.

A fourth objective of the present invention is to provide nano-sized particles of a rare earth metal oxide using a microemulsion technique, thereby producing an extensive array of oxygen vacancies on the surface of each particle.

A fifth objective of the present invention is to provide for methods to evenly disperse the nano-sized particles in liquid carbon-containing combustible materials by producing agglomerate-free nanoparticles that are uniformly suspended in fuel-compatible mixtures.

A sixth objective of the present invention is to provide for methods to enhance the oxygen storage capability of rare earth metal oxides, including but not limited to, ceria, but by doping ceria with other lanthanides such as, lanthanum, neodymium and preferably, mixtures thereof.

A seventh objective of the present invention is to provide compositions and methods for improving engine efficiency for vehicles fueled by carbon-containing combustible materials, such as gasoline, diesel, and jet fuels.

An eighth objective of the present invention is to provide compositions and methods for improving or obtaining complete oxidation of carbon, thereby reducing soot and other oxidation by-products.

A ninth objective of the present invention is to provide a uniformly dispersed additive that oxidizes the polyaromatic hydrocarbons, precursors to soot formation, before they can form solid carbon particles (i.e., soot). The particles will act as nucleation sites that will prevent soot formation at its early monomer stage, when it would otherwise form without the additive.

A tenth objective of the present invention is to provide a ceria-based additive for liquid hydrocarbon fuels; the ceria particles are less than approximately 5 nm in diameter and remain uniformly dispersed within the fuel, with no agglomeration or settling. The carrier liquid for the particles is also compatible with hydrocarbon fuels.

As eleventh objective of the present invention is to provide a ceria nanoparticle additive that can be introduced into a combustion chamber via the air stream if used in an air-intake apparatus.

A twelfth objective of the present invention is to provide a ceria nanoparticle additive that can be introduced into a gaseous fuel or oxidizer using an appropriate carrier fluid for the particles and fluid mechanics techniques, such as spray injection or vaporization.

A thirteenth objective of the present invention is to provide a ceria nanoparticle additive that can be introduced into a heterogeneous solid propellant using an appropriate mixing technique commonly utilized to make said heterogeneous solid propellant.

A fourteenth objective of the present invention is to apply the additive to a solid fuel, such as coal, refuse, or wood by spraying onto the surface or mixing by agitation before curing and venting off the carrier liquid using an appropriate distillation method.

A fifteenth objective of the present invention is to apply the additive to non-hydrocarbon propellants. Examples include silicon-containing fuels, oxidizers, and monopropellants that also may form condensed particles, also called soot, but are not carbon based.

The present invention provides novel nano-sized rare earth metal oxides with large surface area to volume ratios, and sufficient oxygen vacancies on the surface of each particle, so that when mixed with carbon-containing or other soot-forming combustible fuels, there is a significant reduction in soot by-products during the combustion process, an increase in engine efficiency, and less fuel consumption per mile traveled. Less soot production also leads to a reduction of harmful emissions in the environment.

Further objects and advantages of this invention will be apparent from the following detailed description of the presently preferred embodiments, which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. Acronyms used throughout the description of the present invention are defined as follows:

AOT refers to sodium bis(2-ethylhexyl) sulfosuccinate, a surfactant supplied by Aldrich Chemical Company, Inc., Milwaukee, Wis.

$[c]/[c]_{total}$ refers to relative soot concentration and is expressed as a decimal fraction.

$Ce(NO)_3$ refers to cerium nitrate.

$H_2O_2$ refers to hydrogen peroxide.

HRTEM refers to high-resolution transmission electron microscopy, a technique for examining nano-sized ceria particles, its size, shape and structure.

RM refers to reverse micelles, a microemulsion technique for synthesizing rare earth metal oxide particles less than 10 nanometers (nm) in diameter.

The present invention uses nano material synthesis with a novel microemulsion system to produce nano materials with a controlled size, shape, growth rate and engineered oxygen vacancies in the lattice structure. The oxygen vacancies make the nano particles of the present invention extremely efficient and valuable in reducing soot and other emissions in fuel combustion. These nanostructures have excellent oxygen storage and can release oxygen when necessary. The nanoparticles are alternatively referred to herein as oxygen storage components and may be any rare earth doped metal oxide having such oxygen storage capability. Suitable rare earth metal oxides include, but are not limited to ceria, and ceria doped with other lanthanide series and mixtures thereof. In a most preferred embodiment of the invention, the oxygen storage component is essentially ceria.

In the present invention, the engineered oxide nanoparticles can be generally prepared by mixing, with continuous agitation, an aqueous solution of rare earth metal salt, e.g., a carbonate, nitrate, sulfate, chloride salts and the like, in the surfactant dissolved in a hydrocarbon solution. The hydrocarbon is a non-polar solvent such as toluene, octane and higher-octane compounds and can be any of the broad class of saturated hydrocarbons that form a compatible chemical solution wherein the nanoparticles are suspended and evenly dispersed without agglomeration or settling. After mixing the aqueous solution of rare earth metal salt, surfactant and non-polar solvent, the dropwise addition of hydrogen peroxide causes the formation of the oxide nanoparticles capable of significant reductions in soot formation during combustion of fuels. Specific quantities of reactants are given below.

Cerium oxide nanoparticles of a size approximately 2 nm to approximately 10 nm in diameter, are prepared by a process including the steps of dissolving approximately 0.5 grams to approximately 1.0 grams of $Ce(NO_3)_3 \cdot 6H_2O$ in deionized water to make approximately 10 mls of solution to form a first solution, followed by dissolving approximately 3 grams to approximately 4 grams of AOT (surfactant) in approximately 200 ml of solvent to form a second solution, followed by combining the first and the second solutions, followed by stirring the combined solutions for approximately 30 minutes, and drop wise adding approximately 30% hydrogen peroxide ($H_2O_2$) until the stirred combined solution becomes yellow, and subsequently stirring for approximately 30 minutes to approximately 60 minutes more.

The surfactant molecules are influenced by the water molecules to form micelles and changing the water and surfactant ratio can control the size of the micelles. The aqueous solution of rare earth metal salt is then confined to the nano-sized micelles of surfactant forming nano-reactors. When hydrogen peroxide is added to the solution, it penetrates the micelle to react with cerium nitrate to form ceria nano particles. The reaction is represented as follows in equation 1:

$$Ce(NO)_3 + H_2O_2 + H^+(aq) \rightarrow CeO_2 + 3HNO_3 \qquad 1$$

Hydrogen peroxide also converts $Ce^{3+}$ to $Ce^{4+}$ as shown below in equation 2:

$$Ce^{3+} + H_2O_2 + 2H^+(aq) \rightarrow Ce^{4+} + 2H_2O \qquad 2$$

Ce+4 is the most stable state, however, having a mix of Ce+3 and Ce+4 is good because the nanostructure will have many vacancies, which can initiate catalytic reactions. Most of the Ce ions are present on the surface of the nanoparticles, for example approximately 75% for an approximately 2.6 nanometer (nm) particle. Thus, many sites are available for surface chemical reactions for the Ce ions. Oxygen vacancies are generated by such surface chemical reactions. During the surface chemical reactions, oxygen atoms from the ceria surface are taken away leading to non-stoichiometry $CeO_{2-x}$.

Thus, aqueous reverse micelles (RMs) are surfactant aggregates in nonpolar solvents that enclose packets of aqueous solution in their interior. The size of the water droplet can be tuned by varying the ratio of water to surfactant. RMs used as reaction media in the production of nanoparticles whose size and shape are controlled by water and surfactant ratio.

Figure 1A:
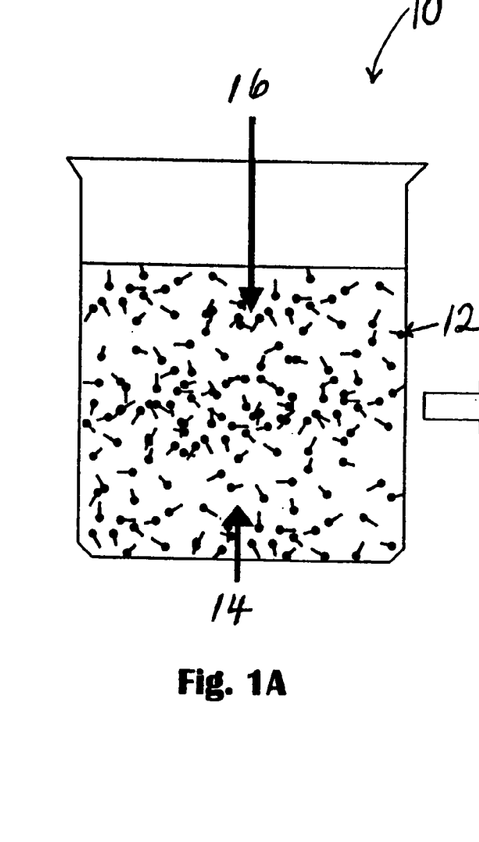
FIG. 1A shows an initial step of adding aqueous cerium nitrate to a non-polar solution with a surfactant to form reverse micelle for the synthesis of ceria nanoparticles.
Figure 1B:
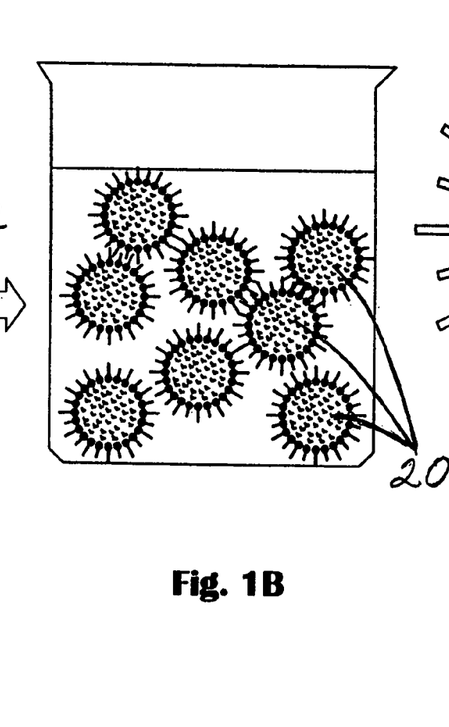
FIG. 1B shows the formation of nano-sized micelles.
Figure 1C:
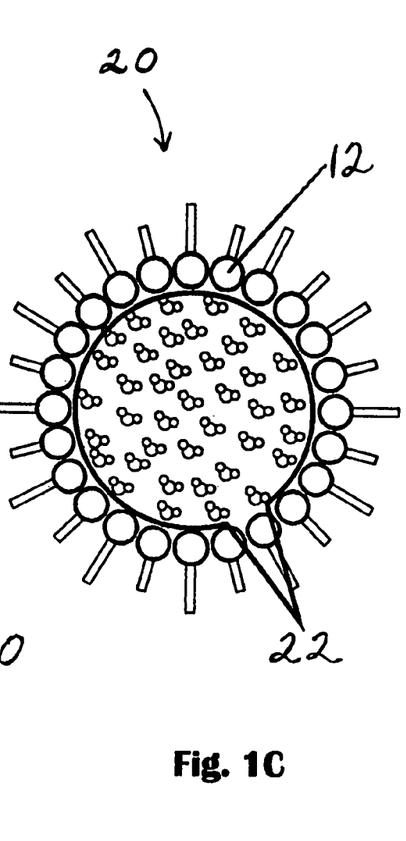
FIG. 1C is an enlarged drawing of one micelle showing aqueous precursor solution surrounded by coordinated surfactant molecules.

Referring now to FIG. 1A, in a suitable mixing vessel 10, approximately 0.5 grams (gm) of surfactant (AOT) 12 was dissolved in 50 milliliters (ml) of toluene 14 and approximately 2.5 ml of approximately 0.1 mole (M) cerium nitrate aqueous solution 16 was added. FIG. 1B shows several micelles of AOT molecules 20 are formed due to the polarity of the aqueous solution. FIG. 1C is an enlarged view of micelle 20 showing an aqueous precursor solution 22 surrounded by surfactant molecules 12 forming a nanoreactor.

Figure 2:
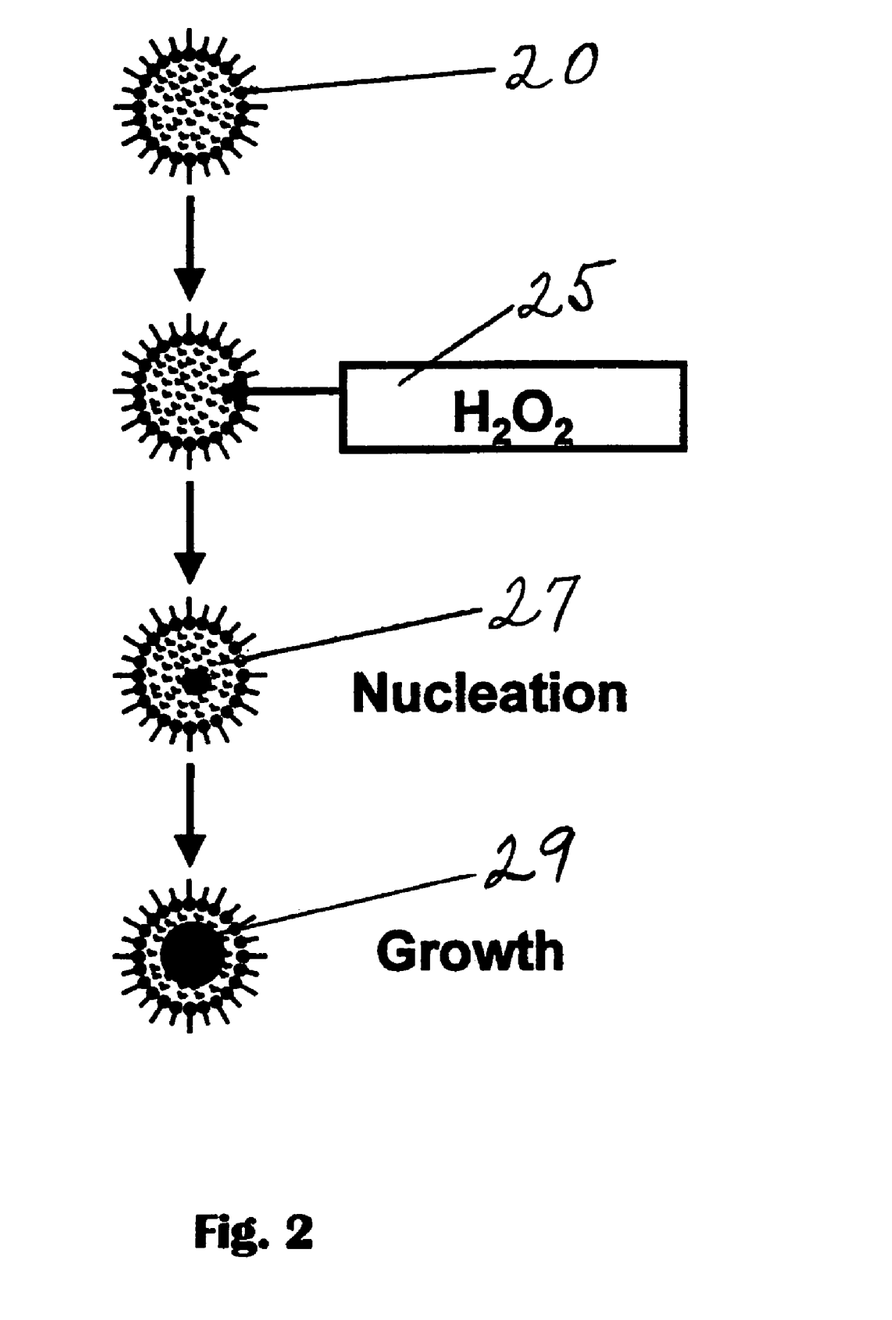
FIG. 2 shows the sequence of particular formation in the synthesis of ceria nanoparticles that are less than 10 nanometer (nm) in diameter; preferably in a range from approximately 4 nm to approximately 7 nm in diameter.

The stepwise sequence of cerium oxide nanoparticle formation by single microemulsion process is shown in FIG. 2. Starting with a micelle 20, approximately 7.5 ml of approximately 30% hydrogen peroxide ($H_2O_2$) 25 is added to begin nucleation 27 and growth 29 in the process to synthesize cerium oxide nanoparticles. The solution obtained by the microemulsion process is used as is; no separation or other processing is involved.

Figure 3:
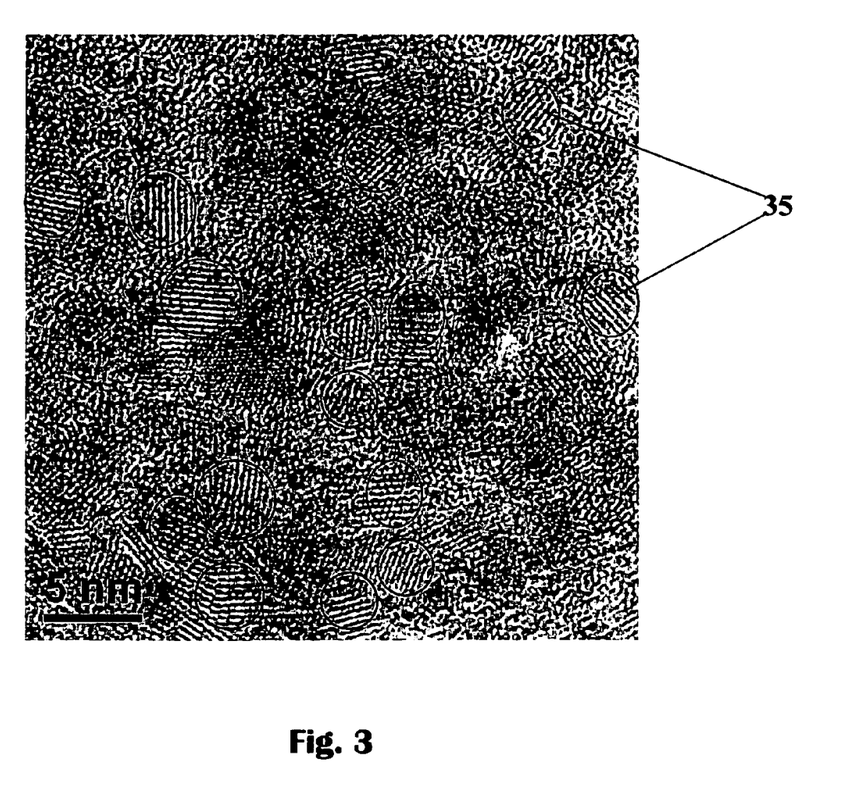
FIG. 3 is high resolution transmission electron microscopy (HRTEM) image of non agglomerated ceria particles having spherical morphology with particle size of approximately 5 nanometers (nm) in diameter for non-agglomerated ceria sol prepared and stabilized using hydrogen peroxide.

FIG. 3 is an HRTEM image of ceria nanoparticles, prepared by the nicroemulsion technique described above. The HRTEM image shows spherical particle 35 morphology with uniform particle size distribution. The ceria nano particles are less than approximately 10 nanometers (nm) in diameter, preferably in a range from approximately 2 nm to approximately 7 nm with a mean size of approximately 5 nm.

Figure 4:
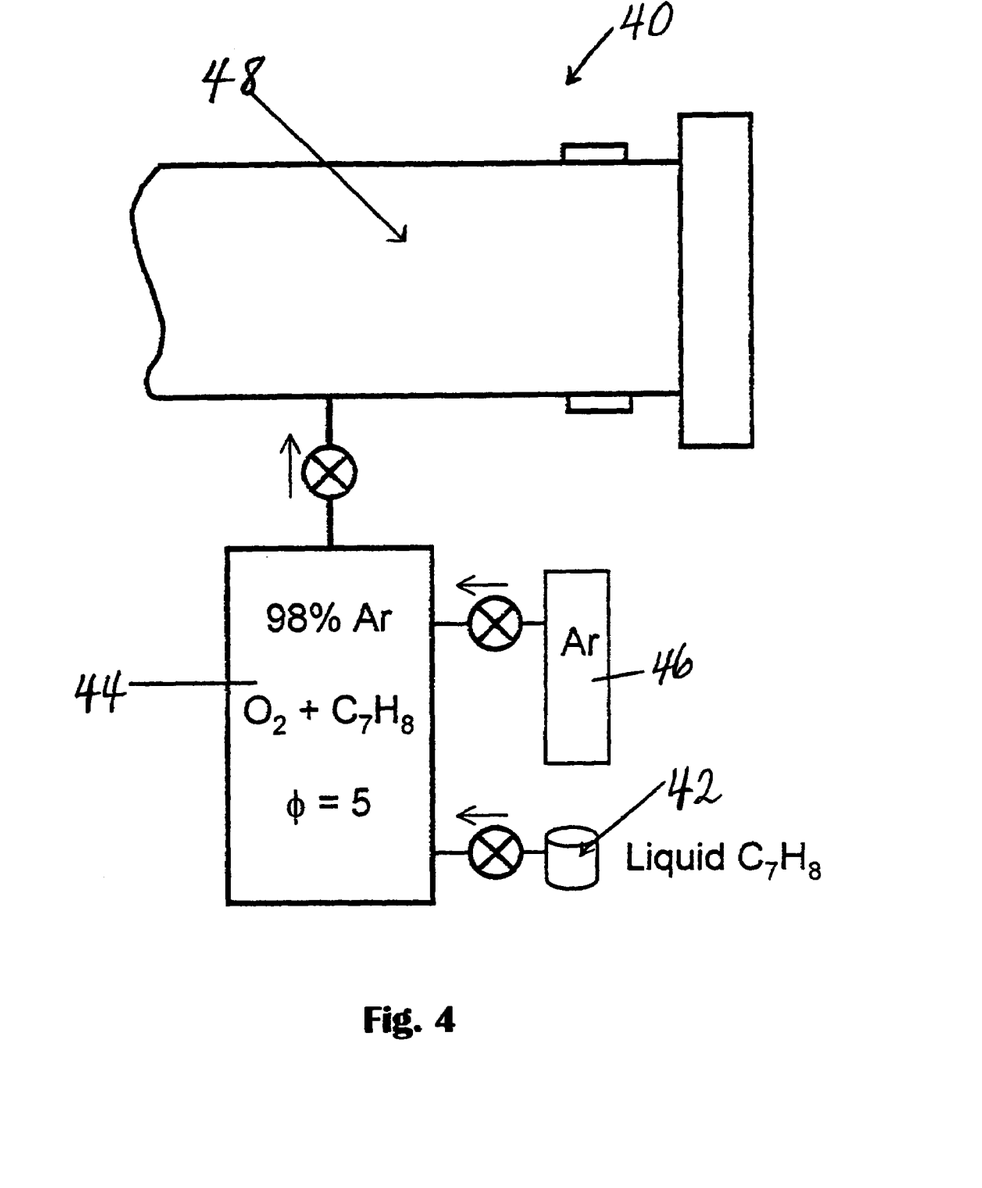
FIG. 4 shows an arrangement of equipment for combustion experiments with toluene and toluene and ceria mixtures.

FIG. 4 is an arrangement of equipment 40 for combustion experiments with toluene 42 and toluene and ceria mixtures premixed in a stainless steel mixing chamber 44 with approximately 98% argon gas (Ar) 46 and oxygen to the desired fuel/oxygen ratio, where φ represents the fuel/oxygen mass ratio relative to the stoichiometric fuel/oxygen ratio. The mixture is then introduced into the shock tube 48 where it is heated to combustion temperatures by a reflected shock wave. Fuel-rich mixtures (φ>1) are demonstrated herein but the experiments can be performed at any φ and any overall concentration.

Figure 5:
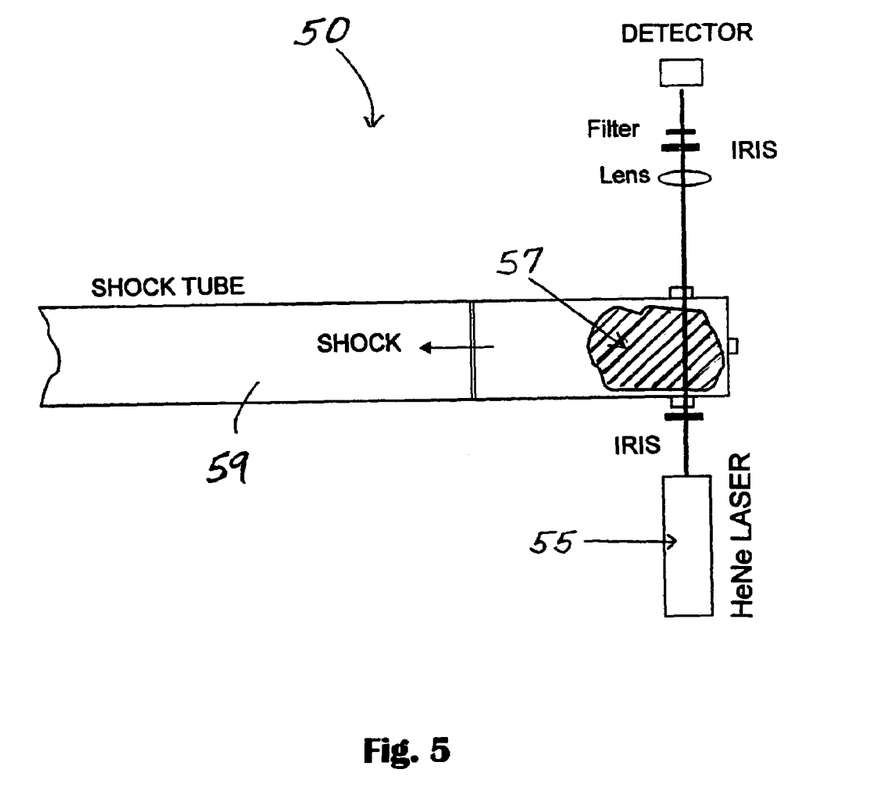
FIG. 5 shows a section of a shock tube facility wherein soot formation is monitored via a laser extinction method.

FIG. 5 is the layout of a shock tube facility 50 used to perform combustion experiments using Helium-Neon laser 55 for the detection of soot 57. The shock-tube test section 59 receives a mixture containing fuel/oxygen/argon. The shock tube is used to quantify the effectiveness of the additive over a wide range of temperatures and mixture compositions. The fuel is toluene with or without ceria additive. The partial pressure of the toluene in the mixing tank is less than the vaporization pressure of toluene at room temperature. The mixture is introduced into the test section 59 as a gas. The operation of the shock tube and the method of introduction of the gas mixture into the tube are standard procedures and well known to those skilled in the art. The introduction of the ceria nano-particle additive does not depend on whether it is introduced with the fuel, oxidizer, or diluent, as it is only the final combustion mixture that matters.

An experimental technique used to monitor the level of soot formation behind reflected shock waves in the shock tube is the well-known laser extinction method, where the ratio of the transmitted (li) to incident (lo) laser light intensity is related to the number density of soot particles, N, via the Beer-Lambert law. The concentration of soot particles [c] is then obtained from the measured number density.

Figure 6:
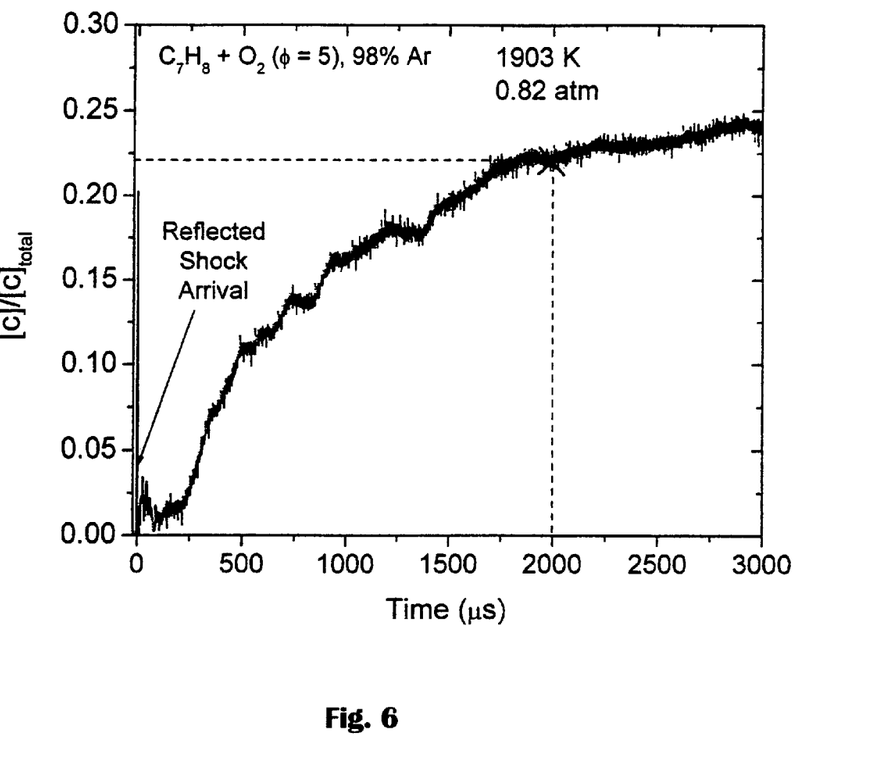
FIG. 6 is a time history of soot formation during combustion without the nano-sized rare earth metal oxide of the present invention, monitored at constant temperature and pressure.

FIG. 6 shows the relative soot concentration as a function of time for a typical shock-tube experiment without ceria addition. The fuel-to-oxidizer equivalence ratio, φ, is defined as the actual fuel-to-oxidizer ratio divided by the stoichiometric fuel-to-oxidizer ratio. The soot concentration is normalized by the total concentration of carbon in the mixture, producing the soot yield. The soot yield at approximately 2 milliseconds is used as the point of comparison between mixtures with and without ceria.

Figure 7:
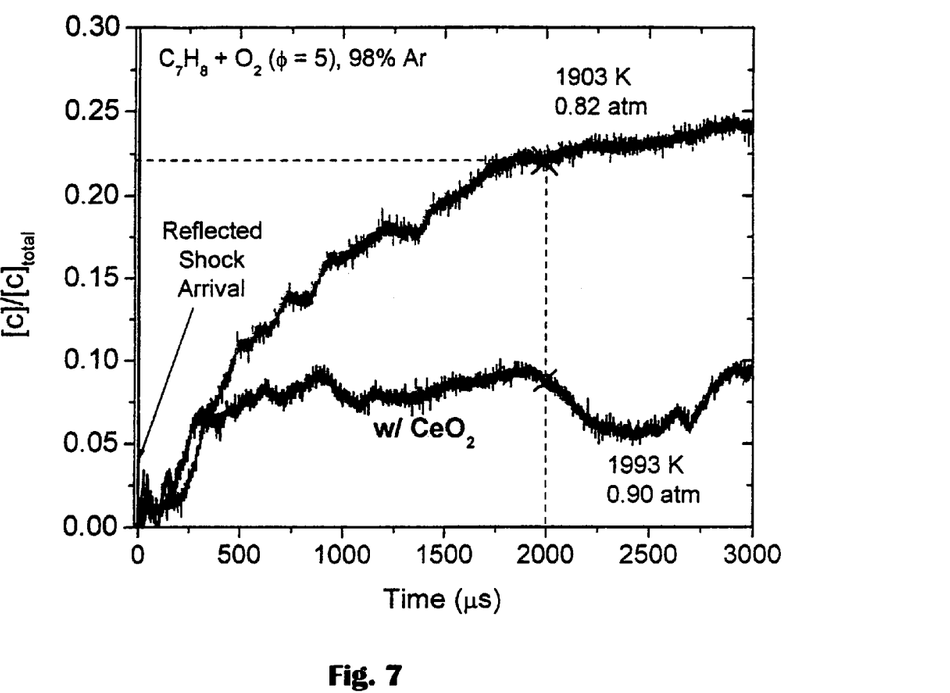
FIG. 7 is a time history of soot formation during combustion with and without the nano-sized rare earth metal oxide of the present invention, monitored at constant temperatures and pressures.

FIG. 7 shows soot yield as a function of time with and without ceria addition. The soot yield is dramatically reduced for the case with ceria addition and is represented as a normalized value, relative to the total concentration of carbon in the mixture. After approximately 2 milliseconds, the ceria additive reduces the normalized soot yield to approximately 0.05, while the combustion of toluene without the ceria additive produced a normalized soot yield of approximately 0.22. The use of the ceria additive resulted in over approximately 67% reduction in soot yield for the experimental results shown.

Figure 8:
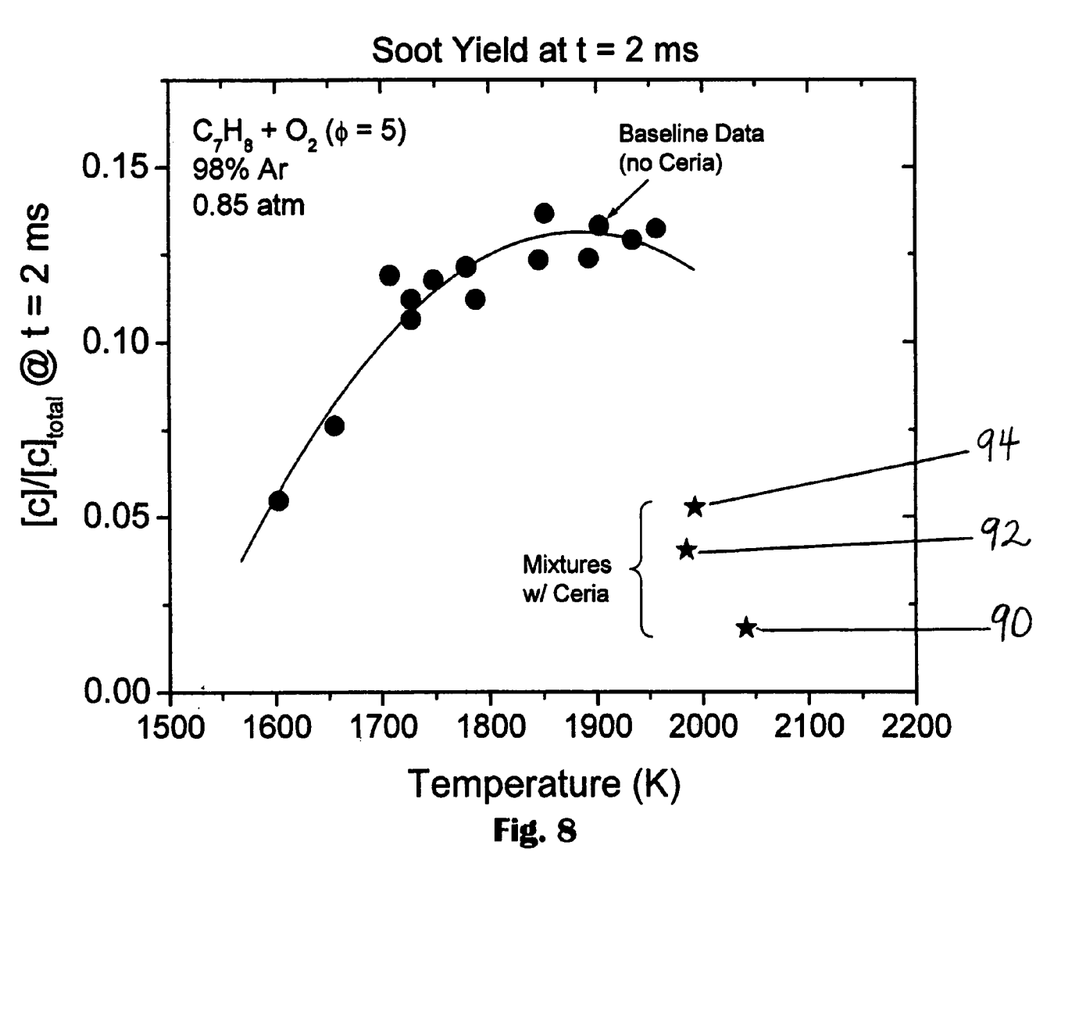
FIG. 8 is a graph showing soot reduction due to ceria nanoparticles.

FIG. 8 shows soot yield after 2 milliseconds with and without ceria addition. Both Mix #1 and Mix #2 are the same toluene/$O_2$/argon compositions, but are separate mixtures made at different times to demonstrate repeatability. Soot yield is reduced approximately 84% at point 90, approximately 67% at point 92, and approximately 57% at point 94; thus, soot yield is reduced in all three instances by approximately approximately 60% or more with the addition of ceria oxide nanoparticles of the present invention.

Figure 9:
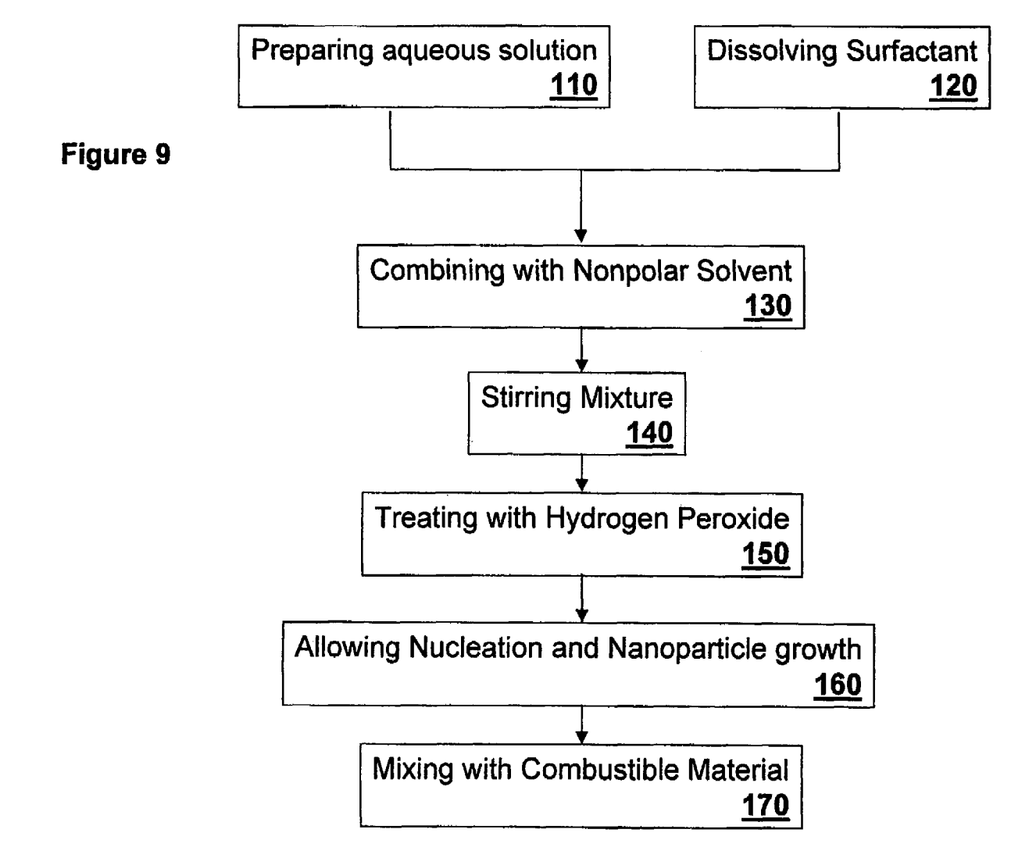
FIG. 9 is a flowchart of method steps of providing nano-sized particles into a combustable material.

FIG. 9 is a flowchart of method steps of providing nano-sized particles into a combustable material. The method can include an efficient method of providing nano-sized particles, having excellent oxygen storage capability, that are uniformly incorporated into a combustible material and reduce soot formation during combustion of said material. The method steps can include the steps of preparing an aqueous solution of a rare earth metal salt 110 and dissolving a surfactant in a nonpolar solvent 120, and combining the aqueous solution of the rare earth metal salt with the nonpolar solvent and surfactant 130. Next, the mixture is stirred to form micelles 140, followed by treating the micelles with hydrogen peroxide 150, and allowing nucleation and growth of nanoparticles of a rare earth metal oxide 160, and mixing the rare earth metal oxide nano-particle reaction product with the combustible material prior to combustion 170.

Figure 10:
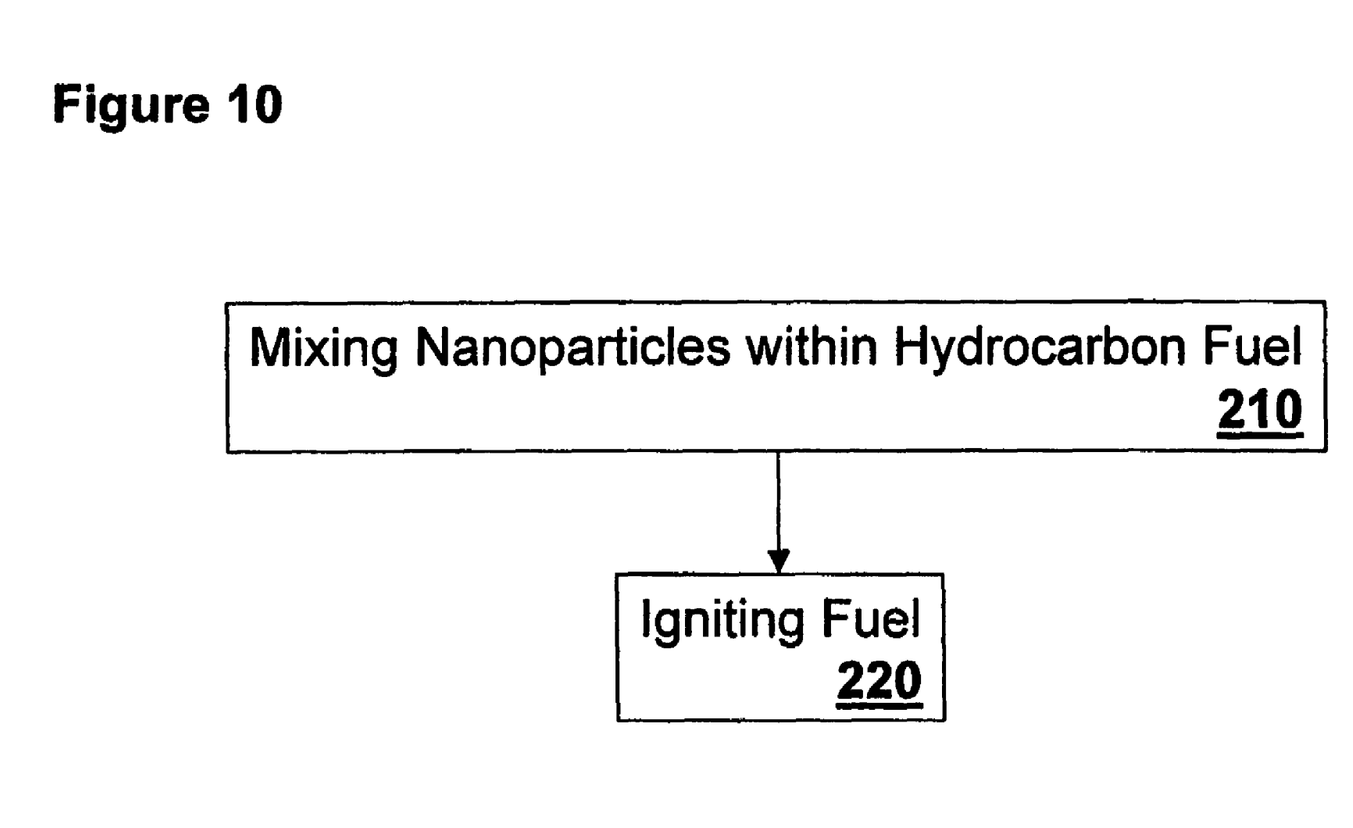
FIG. 10 is a flow chart for enhanced fuel efficiency with nano-sized particles.

FIG. 10 is a flow chart for enhanced fuel efficiency with nano-sized particles. The efficient system for obtaining vehicular fuel efficiency, can include the steps of mixing a solution of nano-sized particles of an oxygen storage component, such as cerium oxide nanoparticles, and a carrier liquid by agitating until the nano-sized particles are in uniform suspension within the hydrocarbon fuel 210, followed by igniting the fuel with the solution of nano-sized particles 220.

The following methods and techniques can be used to introduce the oxide nanoparticles of the present invention to combustible materials that currently produce soot and other particulate matter polluting the environment.

For a gaseous fuel, the ceria nanoparticles can be introduced into the combustion chamber via the air stream if an air-intake apparatus is used. A suitable fluid mechanics technique, such as, but not limited to, spray injection or vaporization, can be used for uniform dispersion of the nanoparticle solution in a gaseous fuel.

In a liquid fuel, the ceria nanoparticles can be introduced into a liquid oxidizer using an appropriate carrier fluid for the particles, such as toluene or octane to form a nanoparticle solution, which is mixed by agitation into the fuel.

In addition, for solid propellant and solid fuels, such as coal, rocket fuel, refuse, or wood, the ceria nanoparticles can be added to the solid fuel as a solution, comprising the nanoparticles and a hydrocarbon carrier liquid. The nanoparticle solution can be either sprayed onto the fuel or heterogeneously mixed into the fuel during manufacture. The volatile carrier liquid is then removed by vaporization, curing, venting or similar method, leaving only the nano-particle/solid fuel blend.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An efficient method of providing nano-sized particles, having excellent oxygen storage capability, that are uniformly incorporated into a combustible material and reduce soot formation during combustion of said material, comprising the steps of:
   a) preparing an aqueous solution of a rare earth metal salt;
   b) dissolving a surfactant in a nonpolar solvent;
   c) combining the aqueous solution of the rare earth metal salt with the nonpolar solvent and surfactant of step b) into a mixture;
   d) stirring the mixture of step c) to form micelles;
   e) treating the micelles with hydrogen peroxide;
   f) allowing nucleation and growth of nano-particles of a rare earth metal oxide; and
   g) mixing the rare earth metal oxide nano-particle reaction product of step f) with the combustible material prior to combustion.

2. The method of claim 1, wherein the rare earth metal salt is selected from the group consisting of cerium salts, ceria doped with lanthanum salts and mixtures thereof.

3. The method of claim 1, wherein the rare earth metal salt is cerium nitrate.

4. The method of claim 1, wherein the non-polar solvent is a hydrocarbon.

5. The method of claim 4, wherein the hydrocarbon is at least one of toluene, octane and mixtures thereof and is a carrier liquid for the rare earth metal oxide nano-particles.

6. The method of claim 1, wherein the surfactant is sodium bis(2-ethylhexyl) sulfosuccinate.

7. A method for reducing soot formation during the combustion of a gaseous fuel comprising the steps of:
   selecting a gaseous fuel that is at least one of natural gas and methane;;
   adding a plurality of nano-sized particles of an oxygen storage component prepared by the process of claim 1 directly to the gaseous fuel; and
   igniting the combination of gaseous fuel and nano-sized particles.

8. A method for reducing soot formation during the combustion of a solid fuel, comprising the steps of:
   selecting a solid fuel that is at least one of rocket fuel, coal, refuse and wood;
   adding a plurality of nano-sized particles of an oxygen storage component prepared by the process of claim 1 directly to the solid fuel; and
   igniting the combination of solid fuel and nano-sized particles.

9. The method of claim 7, wherein the plurality of nano-sized particles of an oxygen storage component is ceria.

10. A method for uniformly introducing the nano-sized particle of an oxygen storage component prepared by the process of claim 1 into an un-reacted gaseous fuel, comprising the steps of:
    a) taking a solution of the oxygen storage component nanoparticles and a carrier liquid with particles uniformly suspended in said solution; and
    b) using a fluid mechanics technique selected from the group consisting of spray injection or vaporization to uniformly disperse the oxygen storage component into the un-reacted gaseous fuel.

11. A method for uniformly introducing the nano-sized particle of an oxygen storage component prepared by the process of claim 1 into an un-reacted solid fuel, comprising the steps of:
    a) taking a solution of the oxygen storage component nanoparticles and a carrier liquid with particles uniformly suspended in said solution;
    b) contacting the surface of an un-reacted solid fuel by a process comprising at least one of spraying or mixing; and
    c) removing the carrier liquid, leaving the un-reacted solid fuel and nano-particle blend.

12. The method of claim 8, wherein the plurality of nano-sized particles of an oxygen storage component is ceria.

* * * * *